Figure 1:
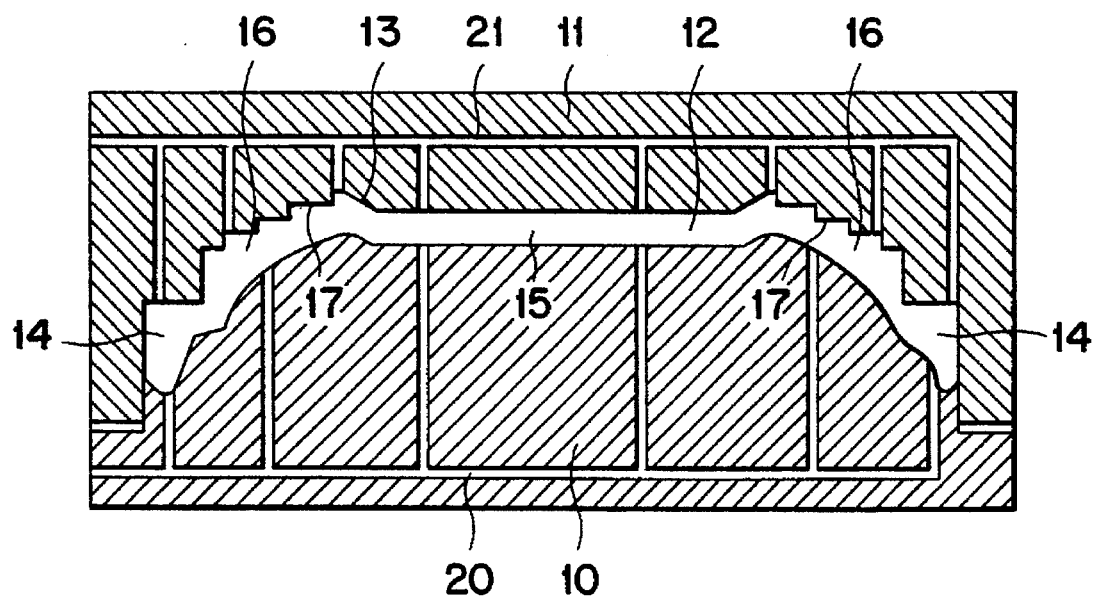

United States Patent [19]
Brander et al.

[11] Patent Number: 5,649,707
[45] Date of Patent: Jul. 22, 1997

[54] CLAY PIGEON AND A METHOD FOR THE PREPARATION THEREOF

[75] Inventors: Kim Brander, Turku; Asko Ristimäki, Nousiainen; Antti Eeva, Raisio, all of Finland

[73] Assignee: Auramatrix Ifo Oy, Finland

[21] Appl. No.: 612,877

[22] PCT Filed: Aug. 30, 1994

[86] PCT No.: PCT/FI94/00379

§ 371 Date: Mar. 8, 1996

§ 102(e) Date: Mar. 8, 1996

[87] PCT Pub. No.: WO95/07245

PCT Pub. Date: Mar. 16, 1995

[30] Foreign Application Priority Data

Sep. 9, 1993 [FI] Finland ........................... 933940

[51] Int. Cl.⁶ .......................................... F41J 9/16
[52] U.S. Cl. ................................. 273/362; 273/380
[58] Field of Search ........................ 273/362, 363, 273/364, 380

[56] References Cited

U.S. PATENT DOCUMENTS 3,587,144  6/1971  Mechling ........................ 425/422
4,623,150  11/1986  Moehlman et al. ............... 273/362
5,389,142  2/1995  Moore ......................... 273/364 X

FOREIGN PATENT DOCUMENTS 2 575 818   7/1986  France .
739 416     9/1943  Germany .
2 133 338   7/1984  United Kingdom .

OTHER PUBLICATIONS

Derwent Abstract of French Patent Application No. 2 575 818.

*Primary Examiner*—William H. Grieb
*Attorney, Agent, or Firm*—Burns, Doane, Swecker & Mathis

[57] ABSTRACT

Provided is a clay pigeon which is a saucer-shaped compressed piece of clay and one or more additives. One of the additives is a calcium-based compound which reduces the drying shrinkage of clay and stabilizes the clay, which is preferably limestone powder or mortar. The clay content is at least 50% and the additive content 5–50%, calculated from the dry matter of the clay pigeon. The clay pigeon may also contain another additive reducing drying shrinkage and a component improving the plasticity of the mass. Also provided is a method for preparing a clay pigeon, where clay, one or more additives, and optionally a component improving the plasticity of the mixture are mixed to form a mass. Water is added if necessary to improve the plasticity of the mass, the mass is fed into a mold in which it is compressed for a moment, and the clay pigeon is removed from the mold while still in a plastic state.

15 Claims, 1 Drawing Sheet

CLAY PIGEON AND A METHOD FOR THE PREPARATION THEREOF

The object of the present invention is a target used in trap and skeet shooting which is known as a clay pigeon. The invention also incorporates a method for its preparation.

In trap and skeet shooting, saucer-shaped targets are propelled by means of an ejection device past the location where the marksmen are. The marksman's intention is to hit the target flying in the air by a shot from a shotgun. The shooting takes place from several different angles with respect to the flight path of the target, and the marksman shooting the best series is obviously the winner. In order for the interpretation of scored hits to be as unambiguous as possible, the target must clearly disintegrate when the pellets hit it. Disintegration must take place regardless of which part of the target the pellets hit.

On the other hand, the targets must withstand transportation to the shooting ranges, the roads leading to which are often in poor condition. The targets must also withstand the strain they are subjected to when propelled into the air by the ejection device. Therefore, the targets are, on the one hand, required to withstand transportation and handling well, but on the other hand, they must disintegrate easily when hit by a shot.

The properties required of the targets have so far been achieved by using as starting material a mass consisting of coal tar ("pitch") and limestone powder. In this mixture, coal tar acts as binder and limestone powder as a filler material. The coal tar content is usually about 20–40%.

Targets containing coal tar have the obvious disadvantage that the pitch-containing dust formed in connection with the disintegration of the target contains an abundance of so-called polycondensated aromatic hydrocarbons, among them carcinogenic substances such as 3,4-benzopyrene. Coal tar is thus a carcinogenic substance. When spread in the environment, pitch dust infiltrates into the groundwater, and through plants—as well as directly—both animals and humans are exposed to it. In addition to the pitch dust, larger pieces of the targets remain on the shooting ranges, and as they disintegrate slowly, they accumulate and remain within reach of animals and spoil the landscape. The health hazards of the present targets arise not only in the situation of use but also during the production process. When the targets are compressed, the raw material mixture is heated to about 150°–250° C., in which case substances hazardous to health are released as gases. Thus, the workers involved in the production process are subjected to very strong exposure. Harmful substances obviously also spread to the surroundings of the production plant.

In addition to environmental problems, the present targets have the disadvantage that their manufacture in Finland is dependent on imported raw materials. Coal tar is not produced in Finland but must be procured from abroad.

Finnish patent publication FI 58396 discloses a clay pigeon, where chalk has been used as filler and petroleum resin as binder. Although the carcinogenity of this binder may be somewhat lower than that of coal tar pitch, this substance is also toxic when deposited in the environment.

The targets used in shooting have also been made of clay on a small scale. In this case the blanks were fired, as is typically done with ceramic objects, to achieve sufficient durability for transportation and propelling. The problem with targets made in this manner was that they were too hard and did not disintegrate when shot at, but merely sustained holes and scratches. The firing is in addition extremely expensive in relation to the price of the raw materials. Targets made of clay were abandoned when the target described above consisting of coal tar and limestone powder was developed some hundred years ago.

The object of the present invention is to eliminate the said disadvantages of the "pitch" and clay targets and to achieve a target consisting of non-toxic, natural substances which disintegrates in the desired manner into several pieces when shot at. By combining the basic raw materials of the clay pigeon in the proportions described below, it will be possible to make targets from clay without firing, which means that the pieces of the targets will soften and disintegrate when they come into contact with water in the environment. Thus the raw materials used in the clay pigeons return to the soil without causing any damage. In addition to their environmental acceptability, the raw materials are readily available and cheap, and thus the product relating to the invention can easily also be made competitive pricewise.

The object of the invention is, therefore, a clay pigeon which is a saucer-shaped compressed piece made of clay and one or more additives. According to the invention, one of the additives is a calcium-based compound which reduces the drying shrinkage of clay and stabilizes the clay. The clay content is at least 50% and the additive content 5–50%, calculated from the dry matter of the clay pigeon.

The object of the invention also comprises a method for preparing the clay pigeon, characterized in that
—clay, one or more additives, and possibly a component improving the plasticity of the mixture are mixed to form a mass
—water is added if necessary to improve the plasticity of the mass
—the mass is fed into a mould in which it is compressed for a moment, and
—the clay pigeon is removed from the mould while still in a plastic state.

The clay pigeon relating to the invention is, therefore, based on readily available clay to which a calcium-based compound reducing the drying shrinkage of clay and stabilising the clay is admixed as one additive. The calcium-based compound is a suitably inorganic calcium compound such as calcium carbonate, calcium hydroxide, calcium oxide or calcium sulphate (gypsum). In practice, suitable additives are, for example, limestone powder or mortar, preferably limestone powder.

The biggest problem in using clay is its characteristic shrinkage which occurs during drying, known as drying shrinkage. Drying shrinkage is caused by water being removed and may exceed 10% in Finnish clays. High shrinkage causes the stability of the shape of the drying object to deteriorate. A precise shape is important for the reliability of use. Although the above-mentioned calcium-based compound reduces the drying shrinkage of clay, to eliminate the problem further, another additive reducing the drying shrinkage of clay may also be added. Suitable materials for this purpose are, for example, sand or other fine-grained soil type, crushed brick, power plant ash, sawdust, expanded clay, metallurgical crushed slag, crushed refuse ore from the mining industry, or chamotte.

The humidity of the mass to be moulded is maintained preferably at 15–30%. The best results have been achieved with the humidity of the mass to be moulded at 18–23%. In practice, the aim is to use the type of clay which has a water content giving the mass to be moulded a suitable humidity content. If necessary, the humidity of the mass can, however, be regulated by adding or removing water.

Clay is the main component of the mass to be moulded. Therefore, calculated as dry matter, clay makes up at least 50% of the dry matter of the mass. The additive content is preferably 5–50% of the dry matter of the mass.

When limestone powder and sand are used as the additives reducing drying shrinkage, the limestone powder content is preferably 10–40% and the sand content 0–25% of the dry matter of the mass. If only limestone powder is added to the clay, and no sand or other additive reducing drying shrinkage, it is preferable to use 20–40% of limestone of the dry matter of the mass.

According to one embodiment of the invention, the limestone powder can be replaced by mortar. Suitable mortar contents range between 5–25% and sand contents between 0–45% of the dry matter. Best results have been obtained using 5–10% mortar and 25–40% sand of the dry mass.

According to one embodiment, the mass used for preparing the clay pigeons also contains a component improving the plasticity of the mass. As the component improving plasticity can be used, for example, lignosulphonate or starch. Lignosulphonates are a component of the waste liquor produced in pulping which originates in the lignin contained by wood. It has been found that lignosulphonates improve the dispersion properties of clay particles, thus maintaining good plasticity of the clay, even when the water content of the mass to be moulded is reduced.

The amount of the component improving plasticity is preferably 0.4–1% of the dry matter of the total mass.

The above requirements placed on targets used in trap and skeet shooting can be met with various material combinations, and thus it should be noted that the above additives, that is, limestone powder or mortar and sand only serve as examples.

From ceramics it is known to add to clay components reducing drying shrinkage, such as sand and other finely crushed substances. While reducing drying shrinkage, these substances at the same time weaken the in itself strong structure of the clay, so that durable ceramic products can only be obtained by firing. Of the clay-based raw material relating to the present invention, end products can be made without firing.

Known targets using coal tar pitch or petroleum resin as binder are cast into moulds while hot, which means that the compressive force required is very low. The target is removed from the mould once the mass has cooled and hardened. The removal can then be easily done by means of ejectors, because at this stage the target withstands mechanical strain without its form suffering. Cooling to the temperature for removal takes some tens of seconds.

The clay-based targets relating to the present invention cannot be prepared or removed from the mould in the manner described above. When the material mixture to form the clay pigeon is fed into the mould it is not a flowing liquid but a plastic mass. The moulding pressure required for the moulding is so high that the mass adheres easily to the mould. The mass also hardens relatively slowly and usually takes several days. Therefore, the mass cannot be left in the mould to harden but the clay pigeon must be removed from the mould while still in a plastic state. Final hardening takes place during storage. These facts, that is, the tendency of the mass to adhere to the mould and the removal of the clay pigeon from the mould while in the plastic state place considerable demands on the removal technique. Mechanical ejectors cannot be used without the shape of the target suffering.

A clay pigeon in the plastic state can be removed, for example, by means of the following methods or combinations of them:

According to one embodiment, the removal is carried out by blowing air between the mould and the clay pigeon formed.

According to another embodiment, the removal is carried out by opening a mould divided into sectors and constructed to be opened.

According to yet another method, the removal is carried out by reducing the contact surface between the mould and the clay pigeon so that a part of the mould's surface is detached from contact with the clay pigeon. A feasible solution in practice is disclosed below in connection with the description of the drawings.

The removal of the clay pigeon from the mould can be facilitated by heating the mould before removal. As a result of the heating, the surface of the clay pigeon hardens more rapidly, thus making it less susceptible to damage. Due to the drying of the surface of the clay pigeon, removal from the mould also becomes easier.

Adhesion of the mass to the mould can be reduced or completely prevented by partly or completely greasing or covering with film that surface of the mould which is in contact with the clay pigeon.

Figure 2:
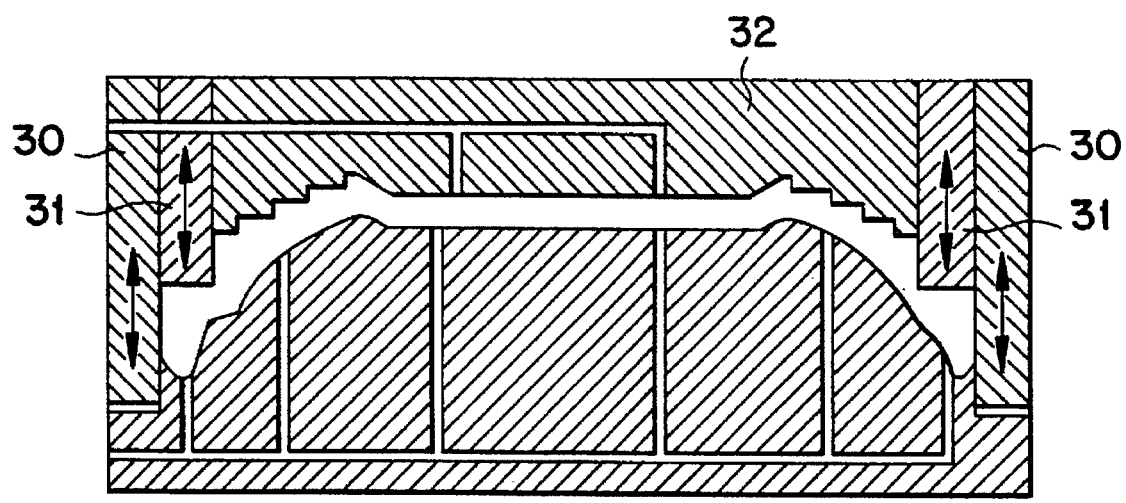

A mould practicable for use in the preparation method relating to the invention is described in greater detail in the following, with reference to the appended drawings in which FIG. 1 shows a cross-sectional side view of the mould used in the preparation method relating to the invention FIG. 2 shows the mould of FIG. 1 according to another embodiment.

In FIG. 1, reference number 10 refers to the bottom part of the mould and number 11 to the top part. Parts 10 and 11 of the mould can be moved with respect to each other. The mould 10, 11 is preferably of metal, hard plastic, or any other material that withstands the required moulding pressure, on which can be given a smooth surface by turning. The space 12 between the bottom part 10 in its lowest position and the upper part 11 corresponds to the shape of the undried and unshrunk clay pigeon. The shape of the concave surface 13 of the top part 11 gives the surface of the target its final shape. The part 16 between the outer ring 14 of the clay pigeon and the centre part 15 is provided with a stepped construction 17, to prevent ricochets. The mass is fed into the mould while the mould is open and the top part 11 is then lowered and the required moulding pressure is exerted on it. According to one embodiment, both the bottom part 10 and the top part 11 are furnished with channels 20 and 21 for air. The removal of the clay pigeon may be carried out so that air is first blown through the channels 20 of the bottom part, in which case the clay pigeon formed will detach from the convex surface of the bottom part. The top part 11, to which the clay pigeon has adhered, is then lifted up. The top part 11 with the clay pigeon is lifted onto a storage plate on which the clay pigeon is placed once it has been removed from the top part 11 by blowing air through the channels 21. The mould parts 10, 11 may be heated, preferably in the vicinity of the surfaces of the clay pigeon.

If the surface of the mould is provided with a film, the removal of the clay pigeon can be carried out by means of this alone.

FIG. 2 shows another embodiment of the mould of FIG. 1, according to which removal can be carried out by reducing the contact surface between the mould and the clay pigeon so that a part of the mould's surface is detached from contact with the clay pigeon. The top part 11 is divided into ring-like parts 30, 31 which are capable of moving in the vertical direction in relation to each other and in relation to the centre part 32. These moving rings can be used to remove the clay pigeon from the top part 11 of the mould. Removal can be carried out, for example, by pressing the rings 30, 31 down with respect to the centre part 32, in which case the surface of the centre part of the target is forced to detach from the surface of the centre part 32 of the top part 11 of the corresponding mould. According to another embodiment, the rings may be lifted up, thus detaching their contact surface from the clay pigeon.

It is obvious to a person skilled in the art that the different embodiments of the invention may vary within the scope of the claims presented below.

We claim:

1. A clay pigeon which is a saucer-shaped compressed piece comprising clay in an amount of at least 50% by weight calculated from the dry matter of the clay pigeon, and an additive in an amount of 5–50% by weight calculated from the dry matter of the clay pigeon, wherein said additive is a calcium-based compound which reduces the drying shrinkage of clay and stabilizes the clay.

2. A clay pigeon as claimed in claim 1, wherein the additive is limestone powder or mortar.

3. A clay pigeon as claimed in claim 1, further comprising a second additive which reduces the drying shrinkage of clay.

4. A clay pigeon as claimed in claim 3, wherein the second additive which reduces drying shrinkage is sand, a fine-grained soil, crushed brick, power plant ash, sawdust, expanded clay, metallurgical crushed slag, crushed refuse ore from the mining industry, or chamotte.

5. A clay pigeon as claimed in claim 1, further comprising a component which improves the plasticity of the mixture comprising clay and the additive.

6. A clay pigeon as claimed in claim 5, wherein the component which improves plasticity is lignosulphonate.

7. A method for preparing the clay pigeon claimed in claim 1, comprising mixing the clay and additive to form a mass, feeding the mass into a mold and compressing the mass, and removing the clay pigeon from the mold while the pigeon is still in a plastic state.

8. A method as claimed in claim 7, further comprising mixing a component which improves plasticity with the clay and additive.

9. A method as claimed in claim 7, further comprising adding water to the mixture of clay and additive to improve the plasticity of the mass.

10. A method as claimed in claim 7, wherein removal is carried out by blowing air between the mold and the clay pigeon.

11. A method as claimed in claim 7, wherein removal is carried out by opening a mold divided into sectors and constructed to be opened.

12. A method as claimed in claim 7, wherein removal is carried out by reducing the contact surface between the mold and the clay pigeon so that a part of the surface of the mold is detached from contact with the clay pigeon.

13. A method as claimed in claim 7, wherein removal of the clay pigeon from the mold is facilitated by heating the mold.

14. A method as claimed in claim 7, wherein adhesion of the mass to the mold is reduced by partly or completely greasing or covering with film that surface of the mold which is in contact with the clay pigeon.

15. A method as claimed in claim 7, wherein adhesion of the mass to the mold is completely prevented by partly or completely greasing or covering with film that surface of the mold which is in contact with the clay pigeon.

* * * * *